United States Patent
Tassakos et al.

(10) Patent No.: US 7,100,258 B2
(45) Date of Patent: Sep. 5, 2006

(54) METHOD AND DEVICE FOR SIMULATION OF A CLOSING WEDGE

(75) Inventors: Charalambos Tassakos, Wuerselen (DE); Jan-Thomas Metge, Stuttgart (DE)

(73) Assignee: inos Automationssoftware GmbH, Stuttgart (DE)

( * ) Notice: Subject to any disclaimer, the term of this patent is extended or adjusted under 35 U.S.C. 154(b) by 350 days.

(21) Appl. No.: 10/733,355

(22) Filed: Dec. 18, 2003

(65) Prior Publication Data
US 2004/0117972 A1 Jun. 24, 2004

Related U.S. Application Data

(63) Continuation of application No. PCT/EP03/12218, filed on Nov. 3, 2003.

(30) Foreign Application Priority Data
Nov. 5, 2002 (DE) ................. 102 51 393

(51) Int. Cl.
*B23Q 7/00* (2006.01)
*B23Q 7/04* (2006.01)
*B25B 11/00* (2006.01)

(52) U.S. Cl. .................. 29/407.1; 29/559; 29/283; 269/21; 269/905; 269/909

(58) Field of Classification Search ............. 29/407.08, 29/407.1, 464, 559, 281.1, 281.4, 283; 269/21; 269/317, 319, 905, 909
See application file for complete search history.

(56) References Cited

U.S. PATENT DOCUMENTS 4,589,184 A * 5/1986 Asano et al. ................. 29/430
5,123,148 A * 6/1992 Ikeda et al. .................. 29/11
6,485,009 B1 * 11/2002 Kashiwazaki et al. ........ 269/21

FOREIGN PATENT DOCUMENTS

| JP | 63141879 A | * | 6/1988 |
| JP | 02193781 A | * | 7/1990 |
| JP | 02193782 A | * | 7/1990 |
| JP | 02193783 A | * | 7/1990 |
| JP | 02204185 A | * | 8/1990 |
| JP | 05261630 A | * | 10/1993 |

* cited by examiner

*Primary Examiner*—Jermie E. Cozart
(74) *Attorney, Agent, or Firm*—Paul Vincent

(57) ABSTRACT

The invention concerns a method and a device (10) for closing wedge simulation to set gap dimensions between a movable flap (5; 5a, 5b) of a vehicle and the surrounding body (1) of the vehicle. The flap (5; 5a, 5b) is initially fitted and held in a roughly adjusted installation position in alignment with the body (1). The flap (5; 5a, 5b) is then finely adjusted such that predeterminable gap dimensions can be met with optimum precision. Finally, the flap (5; 5a, 5b) is movably fixed in the finely adjusted installation position on the body (1). To simplify the closing wedge simulation without losing accuracy for fine adjustment of the flap (5; 5a, 5b), the invention proposes to suction the flap (5; 5a, 5b) against a mechanical stop (15) for fine adjustment using a pneumatic suctioning device (16), wherein the mechanical stop (15) is fixed relative to the surrounding body (1) and is freely pivotable about a substantially vertical axis of rotation (13).

17 Claims, 4 Drawing Sheets

METHOD AND DEVICE FOR SIMULATION OF A CLOSING WEDGE

This application is a continuation of PCT/EP03/12218 filed on Nov. 03, 2003 and claims Paris Convention priority of DE 102 51 393.7 filed Nov. 05, 2002 the entire disclosures of which are hereby incorporated by reference.

BACKGROUND OF THE INVENTION

The present invention concerns a method for setting the gap dimensions between a movable flap of an automotive vehicle and the adjacent body of the vehicle. In this method, the flap is initially fitted and held in a roughly adjusted installation position in alignment with the body, then finely adjusted such that predetermined gap dimensions can be established with maximum precision, and finally movably fixed in the finely adjusted installation position on the body.

The invention also concerns a device for setting the gap dimensions between a movable flap of a vehicle and the adjacent body of the vehicle. The device comprises means for fitting and holding the flap in a roughly adjusted installation position in alignment with the body, means for detecting the gap dimensions and means for fitting and movably fixing the flap in a finely adjusted installation position in which predetermined gap dimensions are met with optimum precision.

The flaps are installed during vehicle assembly. The flaps are, in particular, the doors of the vehicle as well as hood and trunk lid or rear flap. The flaps are installed in corresponding installation openings in the body and movably mounted in a suitable installation position on hinges or joints on the body. A suitable installation position is characterized in that the flaps terminate flush with the adjacent body or with bordering flaps, and are separated uniformly from the adjacent body or the bordering flaps. This process is also referred to as maintenance of predetermined gap dimensions (width and offset) in the installation position.

Conventionally, the flaps are mounted to the hinges or joints on the body in a roughly adjusted installation position. At least one wedge-shaped element, a so-called closing wedge, is inserted into the gap between the flap and the adjacent body or bordering flaps to fit the flap in the installation opening to be flush with the body. The flap is subsequently finely adjusted such that predetermined gap dimensions are maintained with maximum accuracy while the closing wedge continues to hold the flap flush with the body. Finally, the flap is movably fixed in the finely adjusted installation position on hinges or joints. The insertion of the closing wedge is a very difficult and also very inaccurate procedure For this reason, other methods were developed which permit mounting of the flaps of a vehicle and, in particular, setting of the gap dimensions between the flaps and the adjacent body or bordering flaps without using a closing wedge (so-called closing wedge simulation). In the simplest embodiment, instead of a closing wedge, a magnetic element is externally disposed onto the body in the region of the gap between a flap to be installed and the adjacent body or bordering flap such that it covers the flap and also the adjacent body or the bordering flap. The use of a magnet for closing wedge simulation is, however, also very demanding and very imprecise.

A relatively demanding method for closing wedge simulation has been developed with which the entire vehicle body must be disposed at a predetermined position in three-dimensional space using a so-called lifting station. This method provides a device for closing wedge simulation which comprises a mechanical stop supported on the adjacent body or on the already installed bordering flap as well as on the flap to be installed, and a pneumatic suctioning device which draws the flap to be installed against the stop. These mechanical and pneumatic tools for closing wedge simulation are moved by a handling device having e.g. an articulated arm robot. The handling device and tools mounted thereto are positioned at an absolute location in three-dimensional space. Positioning of the body in three-dimensional space brings the body into a defined position relative to the tools for closing wedge simulation. In this conventional method, closing wedge simulation takes place at a predetermined absolute position in three-dimensional space, which requires positioning of the entire body. This involves, however, great effort and the costs for such closing wedge simulation are very high.

It is the underlying purpose of the present invention to facilitate and reduce the costs for closing wedge simulation while still permitting highly precise fitting of a flap into the surrounding body of a vehicle.

SUMMARY OF THE INVENTION

Departing from the above-mentioned method, this object is achieved in the present invention by drawing the flap against a mechanical stop for fine adjustment using a pneumatic suctioning device, wherein the mechanical stop is fixed relative to the surrounding body and is freely pivotable about a substantially vertical axis of rotation.

One important aspect of the present patent application is the pivotability of the mechanical stop about the axis of rotation. This permits an arbitrary positioning of the vehicle body in three-dimensional space within a certain range. The stop can be brought into a defined position relative to the body through pivoting about the axis of rotation. In the present invention, the closing wedge simulation is not effected with respect to an absolute location in three-dimensional space, rather with respect to a certain relative position between body and mechanical stop. This greatly facilitates the procedure and reduces the costs of fitting and mounting the flaps to the vehicle body.

The mechanical stop can also be pivoted about a further axis of rotation which extends substantially horizontally to produce further degrees of freedom for positioning the stop relative to the vehicle body. A combination of pivotability about the two axes of rotation using a suitable joint, e.g. a ball joint, is also feasible.

Pivoting of the mechanical stop about the axes of rotation is preferably effected without a separate drive. The stop is moved to the flap to be fitted and is supported at points on the adjacent body, on a bordering installed flap, or on the flap to be fitted. During further motion of the stop towards the flap to be fitted, the stop is pivoted about the axes of rotation until it is supported with its full surface on the adjacent body or the bordering installed flap and on the flap to be fitted. In this position, the flap to be fitted can be suctioned against the stop by a pneumatic suctioning device, the position of the flap relative to the adjacent body can be finely adjusted and the flap is finally movably fixed on hinges or joints at the finely adjusted installation position.

In accordance with an advantageous further development of the present invention, the fixed relation between the mechanical stop and the surrounding body is obtained by supporting the mechanical stop on at least one support point on the surrounding body and at least one further support point on the flap, wherein the axis of rotation, viewed in a direction substantially perpendicular to the surface extension of the flap, lies between the support points. The stop points are preferably flat and the shape of the stop surfaces is preferably adjusted to the shape of the corresponding surrounding body or the flap to be fitted. Moreover, the orientation of the support surfaces relative to each other is preferably adjusted to the orientation of the corresponding surrounding body, relative to the flap to be fitted. The mechanical stop forms an extension of the surface of the adjacent body or the installed flaps. Suctioning the flap to be fitted towards the stop aligns the flap with the surrounding body or with the installed flaps.

In a preferred embodiment of the invention, the mechanical stop is approached using a handling device for the flap, in a direction substantially perpendicular to the surface extension of the flap. The handling device is e.g. an articulated robot arm.

In accordance with another advantageous further development of the present invention, the mechanical stop and the pneumatic suctioning device form a closing wedge simulation unit which can be pivoted about a substantially vertical common axis of rotation, and the flap is approached substantially perpendicular to its surface extension until the mechanical stop is supported on least two support points on the surrounding body and the flap is drawn against the mechanical stop by the pneumatic suctioning device. The closing wedge simulation unit can also be pivoted about a further, substantially horizontal axis of rotation. A combination of pivotability about the two axes of rotation using a suitable joint, e.g. a ball joint, is also feasible.

A further solution of the object of the present invention is based on a device of the above-mentioned type, wherein the means for fitting the flap in the finely adjusted installation position have a mechanical stop and a pneumatic suctioning device, with the mechanical stop being fixed relative to the surrounding body and is freely pivotable about a substantially vertical axis of rotation, wherein the pneumatic suctioning device draws the flap against the mechanical stop.

In accordance with a preferred further development of the present invention, the mechanical stop is fixed relative to the surrounding body by supporting the mechanical stop on at least one support point on the surrounding body and, on at least one further support point on the flap, and, viewed in a direction substantially perpendicular to the surface extension of the flap, the axis of rotation is between the support points.

In accordance with a preferred embodiment of the present invention, the mechanical stop is resiliently disposed substantially perpendicular to the surface extension of the flap using a first spring element. The stop is moved towards the flap to be fitted and comes to a rest, at least at points on the surrounding body, on a bordering installed flap, or on the flap to be fitted. When the stop is further moved towards the flap to be fitted, it is pivoted about the axes of rotation until it is supported with its entire surface on the surrounding body or on the bordering installed flap. A further motion of the mechanical stop in the direction of the flap to be fitted, substantially perpendicular to the surface extension of the flap, is compensated for through spring elements. The mechanical stop can thereby be moved towards the flap to be fitted using a simple control mechanism: a position-regulated approach is not required. Deviations between the desired value and the actual path which is travelled for controlling the approach of the stop to the flap to be fitted, can be compensated for by the spring elements without damaging the body.

The mechanical stop is advantageously resiliently held in a preferred pivoting position about the axis of rotation using a second spring element. When the stop approaches the surrounding body or the installed flaps and the flap to be fitted, the stop is pivoted about the axis of rotation in opposition to the spring force of the spring element to such an extent that it is supported on the surrounding body or on a fitted flap and on the flap to be fitted.

To reduce the size and facilitate handling of the device, the pneumatic suctioning device and the mechanical stop are formed as a closing wedge simulation unit which can be pivoted about a common axis of rotation. The unit can be moved on a common handling device and be supported on the surrounding body or on installed flaps and the flap to be fitted.

It is particularly advantageous to form the pneumatic suctioning device as an expansion bellows suctioning device, wherein the part of the mechanical stop where the flap to be fitted abuts, is disposed inside the expansion bellows to further reduce the size of the device.

Further features, possible applications and advantages of the invention can be extracted from the following description of embodiments of the invention which are shown in the drawing. All features described or shown illustrate the subject matter of the invention individually or collectively in arbitrary combination, independently of their recitation in the claims or their dependencies and independently of their formulation or representation in the description and the drawing.

DESCRIPTION OF THE PREFERRED EMBODIMENT

Figure 1:
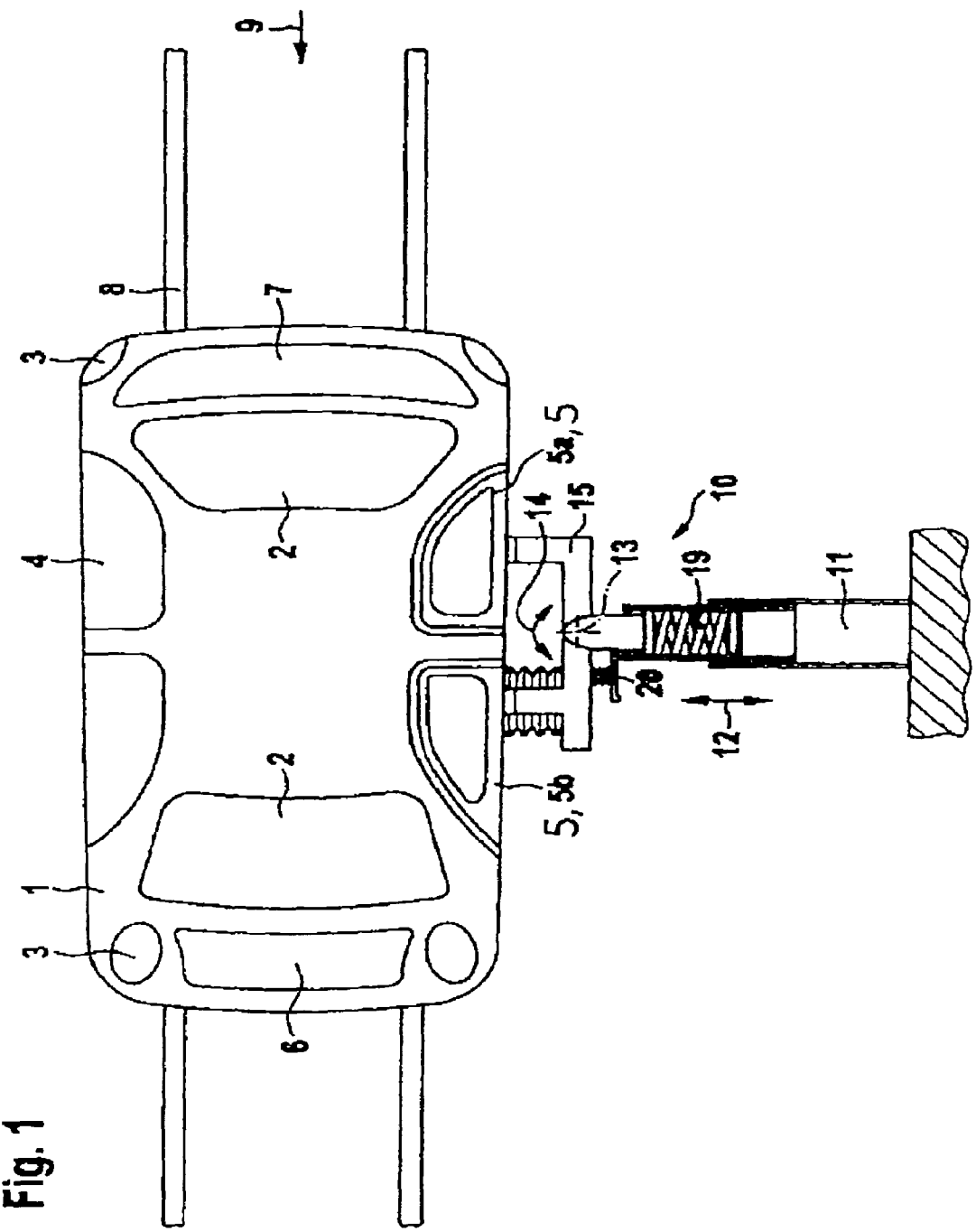
FIG. 1 shows a partially sectional schematic top view onto an inventive device in accordance with a first preferred embodiment.

FIG. 1 shows a vehicle body designated as 1. The body 1 has installation openings 2 for windshield and rear window and installation openings 3 for headlamps and rear lamps. The body 1 also has installation openings 4 for doors 5, an installation opening 6 for a hood and an installation opening 7 for a trunk lid or a rear flap. The doors 5, the hood and the trunk lid or the rear flap are commonly referred to as flaps.

The body is moved on an assembly line 21 (FIG. 3) past different mounting stations, i.a. also past a station (shown in FIG. 1) for installing the flaps 5. The assembly line 21 may be formed as an unguided transport system (UTS) or in any other form. In particular, the body 1 can be mounted to the assembly line 21 or be suspended from the assembly line. In the present embodiment of FIG. 1, the assembly line 21 is formed as an UTS on which the body 1 is mounted and which moves along a predetermined path in the direction of an arrow 9 by means of guiding rails or induction loops 8, which are sunk into the floor.

During motor vehicle assembly, the flaps 5 are i.a. installed in the installation openings 4, 6, 7. The flaps 5 are inserted into the installation openings 4, 6, 7 in the body 1 and movably mounted in a suitable installation position to hinges or joints on the body 1. A suitable installation position is characterized in that the flaps 5 terminate flush with the surrounding body 1 or with bordering installed flaps 5, and are evenly separated relative to the surrounding body or the bordering flaps. This process is referred to as maintenance of the predetermined gap dimensions (width and offset) in the installation position.

In the embodiment shown in FIG. 1, the door 5a at the rear left-hand side is initially installed. The surrounding vehicle body 1 thereby at least partially represents a reference surface at which the door 5a is aligned. The installed door 5a is therefore part of the surrounding vehicle body 1 after its installation. The door 5b is then installed at the front left-hand side. The installed door 5a now at least partially represents a reference surface for alignment of the door 5b.

The door 5b is initially inserted into the installation opening 4 at the front left-hand side in a roughly adjusted installation position e.g. using a handling device (not shown), and mounted to the body 1 through hinges or joints. The joints between the door 5b and the surrounding body 1 or the bordering installed flaps 5a are then measured and the door 5b is adjusted in the installation opening 4 with high precision to meet the predetermined gap dimensions. Conventional methods and devices may be used for fine adjustment of the flaps 5 in the installation openings 4, 6, 7. Image analysis and image processing means are preferably used for detecting the gap dimensions. In the finely adjusted installation position, the door 5b is movably fixed to the body 1 via hinges or joints. In this connection, "movable" means that the flaps can be opened but are mounted substantially without play to the body 1. Installation of the doors 5a, 5b on the left-hand side of the vehicle is thereby completed.

Figure 2:
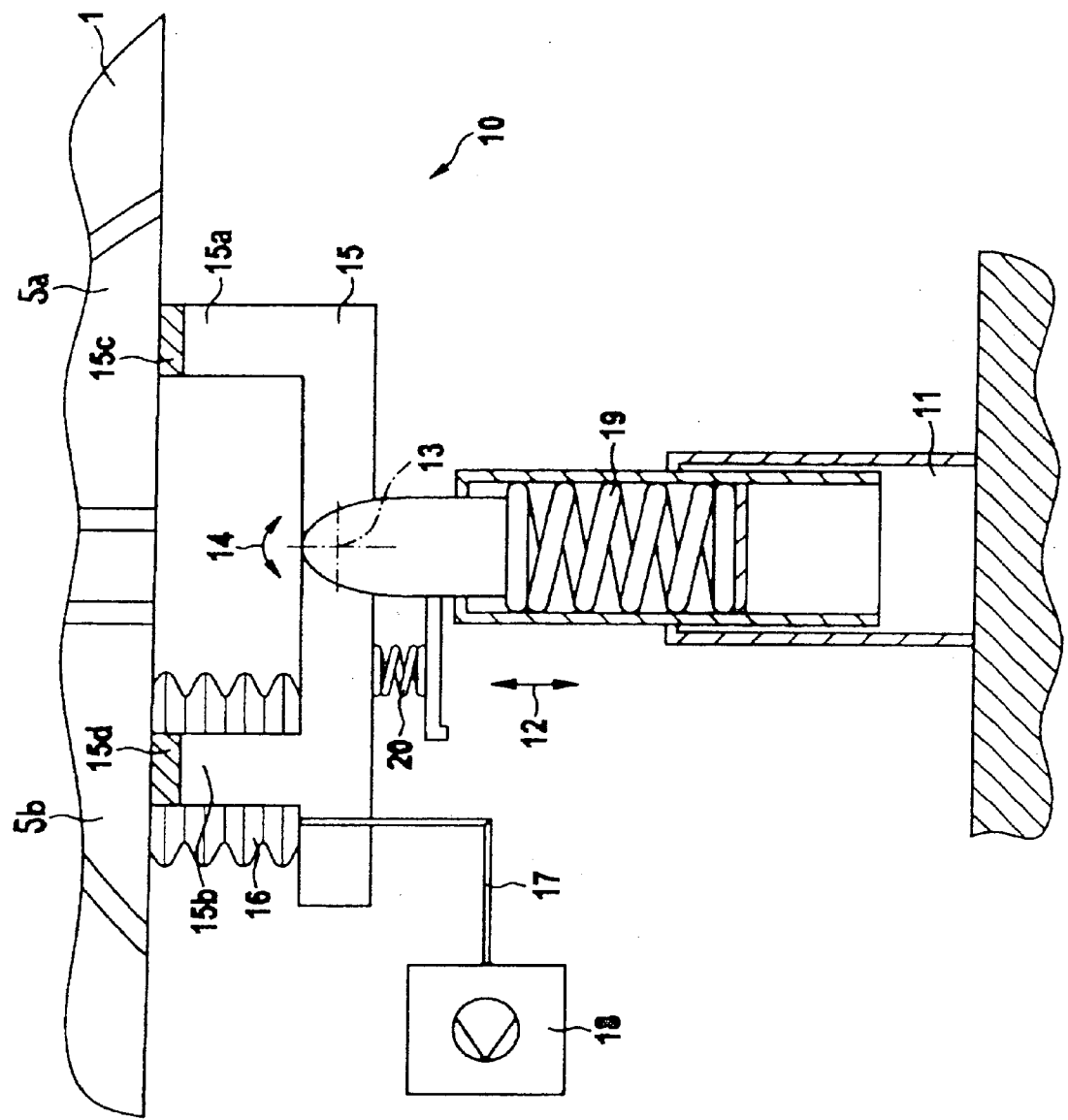
FIG. 2 shows a detail top view of the inventive device of FIG. 1.

The present invention relates, in particular, to fine adjustment of the flaps 5 in the installation openings 4, 6, 7. To hold the doors 5 in the installation opening 4 during fine adjustment, an inventive device is provided which is referred to in its entirety with reference numeral 10. The device 10 is shown in detail in FIG. 2. Corresponding devices are provided in the station (shown in FIG. 1) for installation of the flaps 5 for fine adjustment of the doors on the right-hand side of the vehicle in the installation openings 4, the hood in the installation opening 6 and the trunk lid or rear flap in the installation opening 7.

The device 10 can be moved by a handling device 11 in a direction (double arrow 12) which extends substantially perpendicular to the surface extension of the doors 5. The handling device 11 comprises e.g. a portal robot, wherein the device 10 is mounted on the distal end of a robot arm such that it is pivotable about an axis of rotation 13 (double arrow 14). The device 10 comprises a mechanical stop 15. A part 15a of the mechanical stop 15 is supported on the surrounding body 1 or on the installed door 5a. Another part 15b of the stop 15 is supported on the door 15b to be fitted. The support surfaces 15c, 15d of the stop 15 and body 1 or doors 5 are cushioned through suitable damping elements to prevent damage to the body 1 or doors 5. The damping elements are made e.g. from plastic material, rubber or foamed material.

Part 15b of the stop 15 is disposed inside an expansion bellows suctioning device 16. It is connected to a vacuum generating means 18 via a pressure line 17. The part 15b of the stop 15 can, of course, also be disposed outside of the expansion bellows suctioning device 16.

The device 10 is resiliently disposed substantially perpendicular to the surface extension of the flap (double arrow 12) via a first spring element 19. The mechanical stop 15 and the pneumatic suctioning device 16 are resiliently held by a second spring element 20 in a predeterminable pivoting position about the axis of rotation 13.

For inserting the door 5b into the installation position 4, the door 5b is initially inserted into the installation opening 4 in a roughly adjusted installation position and mounted via the hinges or joints to the body 1. The device 10 is then moved towards the door 5b substantially perpendicular to the surface extension of the door 5b to be fitted. Part 15a comes to a rest on the bordering installed door 5a via a plurality of support points of the support surface 15c. The expansion bellows suctioning device 16 is supported on the door 5b to be fitted and suctions the door 5b against the further abutment surface 15d of the other part 15b of the stop 15. During measuring of the gap dimensions between the door 5b and the surrounding body 1 or the installed flap 5a, the door 5b is held by the device 10 in alignment with the surrounding body 1 or the installed door 5a as part of the body 1. Pressure can be exerted by the first spring element 19 on the door 5b to be fitted such that it is safely held in the installation position. This process is referred to as a closing wedge simulation since for this purpose, in former times, a closing wedge was wedged into the gap between the door 5b to be fitted and the surrounding body 1 such that the door 5b was held flush with the surrounding body 1. When the door 5b is finely adjusted, it is movably fixed to the body 1 using hinges or joints.

Figure 3:
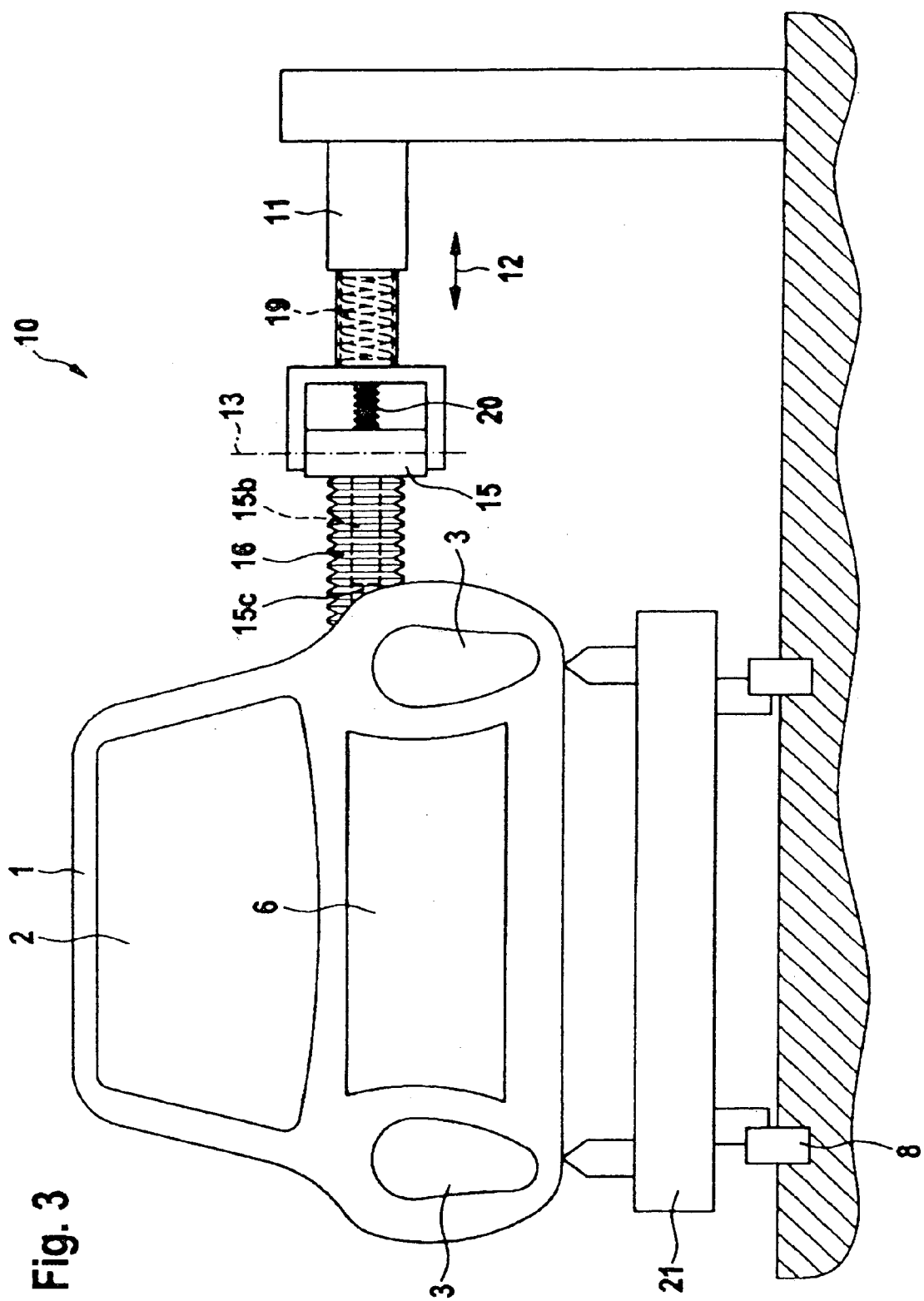
FIG. 3 shows a front view of the inventive device of FIG. 1.

FIG. 3 shows a front view of the station for fitting the flaps 5 with the inventive device 10. The same components have the same reference numerals.

One important aspect of the present invention is that the closing wedge simulation is not performed in a predetermined absolute location in three-dimensional space but in any relative position (within certain limits) between the stop 15 and the flap 5 to be fitted. This avoids expensive positioning of the vehicle body 1 in three-dimensional space. It is completely sufficient for installation of the flaps 5 when the body on the assembly line passes the station shown in FIG. 1 with a limited inaccuracy. Inaccuracies in the relative position between the flap 5 to be fitted and the device 10 for closing wedge simulation can be accommodated and compensated for by the pivotability of the device 10 about the axis of rotation 13 and by the first spring element 19.

Figure 4:
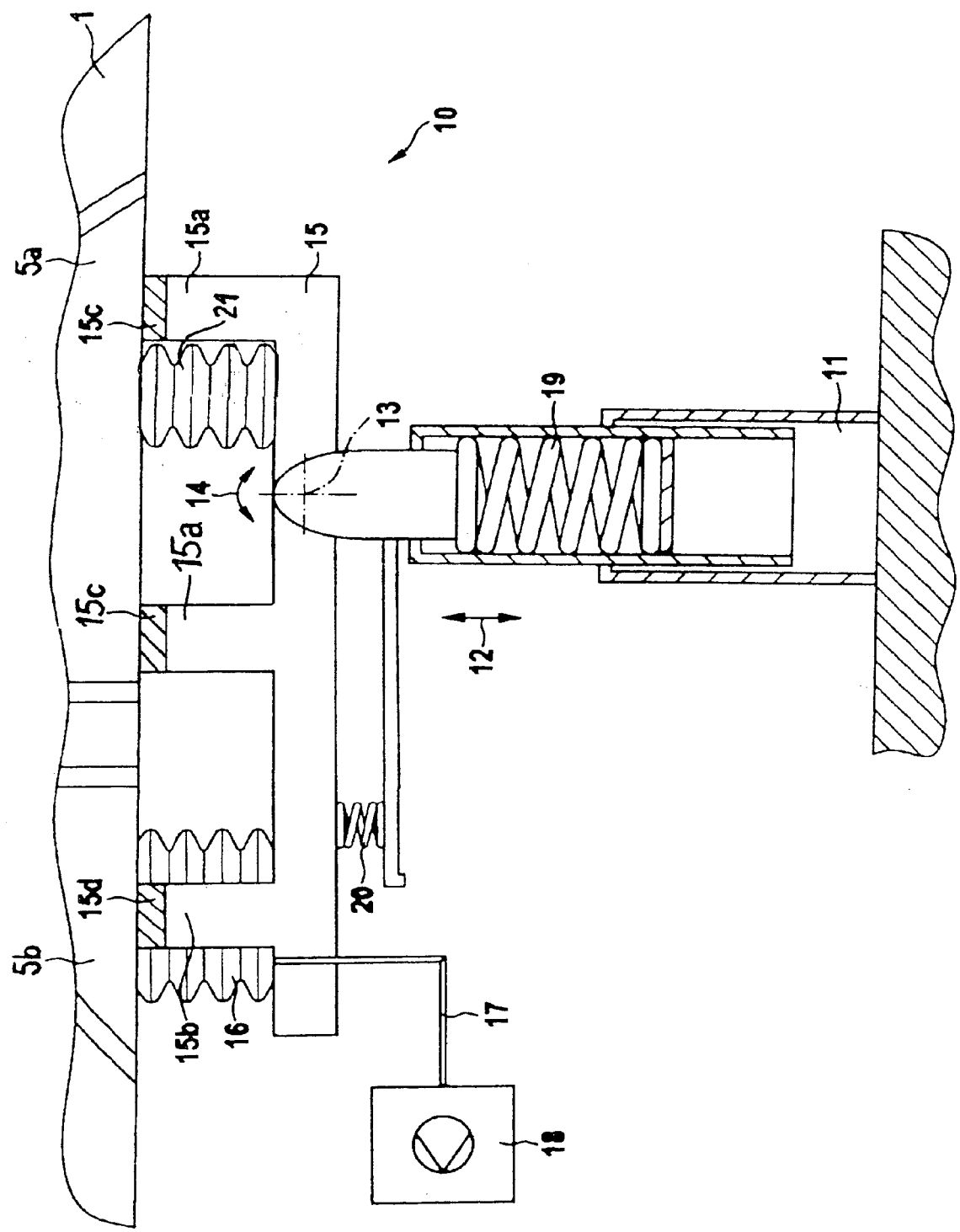
FIG. 4 shows a top view of the inventive device in accordance with a second preferred embodiment.

FIG. 4 shows a further embodiment of the present invention. Components which correspond to those in the first embodiment of FIG. 2 have the same reference numerals. In contrast to the first embodiment, the stop 15 of the device 10 of FIG. 4 has two mutually separated parts 15a, each of whose ends has a support surface 15c which are each supported on the body 1 or on an installed flap 5a. The axis of rotation 13 is in the region of the two parts 15a of the stop 15 and the two support surfaces 15c. A virtual straight line is defined by the two support surfaces 15c on which the further support surface 15d is also disposed and towards which the flap 5b to be aligned is pulled.

A second expansion bellows suctioning device 21 is provided in the region of the two parts 15a, through which the device 10 is suctioned after approaching the body 1 or the installed flap 5a, such that these parts abut the support surfaces 15c. The expansion bellows suctioning device 16 can draw the flap 5b to be aligned against the stop surface 15d such that the support surfaces 15c are not lifted from the body 1 or the aligned flap 5a. The further expansion bellows suctioning device 21 must not be necessarily disposed between the two stop surfaces 15c but can be provided anywhere along the stop 15 where it abuts the body 1 or an installed flap 5a as the device 10 approaches the body 1.

The support surfaces 15c, 15d can theoretically be formed by one single support point. This, however, involves the risk of damage, in particular, of dents or scratches in the body 1 or the flaps 5; 5a, 5b to be aligned. To prevent this, the forces are transmitted not via one single support point but via a plurality of points of the support surfaces 15c, 15d, on the body 1 or the flaps 5; 5a, 5b to be aligned.

We claim:

1. A method for setting gap dimensions between a movable flap of an automotive vehicle and a surrounding body of that vehicle, the method comprising the steps of:
   a) initially fitting the flap and holding the flap in a roughly adjusted installation position in alignment with the body;
   b) suctioning the flap against a mechanical stop using a pneumatic suctioning device, said mechanical stop being fixed relative to the surrounding body but freely pivotable about an axis of rotation;
   c) finely adjusting the flap by pivoting said mechanical stop to achieve predetermined gap dimensions; and
   d) movably fixing the flap to the body following step c), wherein a fixed relation of said mechanical stop to the surrounding body is obtained by supporting said mechanical stop on at least one first support point on the surrounding body and on at least one second support point on the flap, wherein, viewed in a direction substantially perpendicular to a surface extension of the flap, said axis of rotation is thereby disposed between said first and said second support points.

2. The method of claim 1, wherein said axis of rotation extends parallel to a surface extension of the flap.

3. The method of claim 2, wherein said axis of rotation is vertical.

4. The method of claim 1, wherein a fixed relation of said mechanical stop relative to the surrounding body is obtained by supporting said mechanical stop on at least two support points on the surrounding body, wherein, viewed in a direction substantially perpendicular to a surface extension of the flap, said axis of rotation is thereby disposed in a region of said at least two support points.

5. The method of claim 1, wherein said mechanical stop is approached substantially perpendicular to a surface extension of the flap using a handling device for the flap.

6. The method of claim 1, wherein said mechanical stop and said pneumatic suctioning device form a closing wedge simulation unit which can be pivoted about a substantially vertical common axis of rotation, wherein said unit approaches the flap substantially perpendicular to a surface extension of the flap until said mechanical stop is supported on at least two support points on the surrounding body, wherein the flap is then drawn by said pneumatic suctioning device against said mechanical stop.

7. The method of claim 1, wherein said stop is drawn against the surrounding body using a further pneumatic suctioning device.

8. A device for setting gap dimensions between a moveable flap of an automotive vehicle and a surrounding body of that vehicle, the device comprising:

means for initially fitting the flap and for holding the flap in a roughly adjusted installation position in alignment with the body;

a mechanical stop, said mechanical stop being fixed relative to the surrounding body but freely pivotable about an axis of rotation;

a pneumatic suctioning device for suctioning the flap against a mechanical stop;

means for finely adjusting the flap by pivoting said mechanical stop to attain predetermined gap dimensions; and means for movably fixing the flap to the body in a finely adjusted installation position on the body, wherein said mechanical stop is fixed relative to the surrounding body, said mechanical stop being supported on at least one first support point on the surrounding body and on at least one second support point on the flap, wherein said axis of rotation, viewed in a direction substantially perpendicular to a surface extension of the flap, is disposed between said first and said second support points.

9. The device of claim 8, wherein said axis of rotation extends parallel to a surface extension of the flap.

10. The device of claim 9, wherein said axis of rotation is vertical.

11. The device of claim 8, wherein said mechanical stop is fixed relative to the surrounding body, said mechanical stop being supported on at least two support points on the surrounding body and, viewed in a direction substantially perpendicular to a surface extension of the flap, said axis of rotation is disposed in a region of said at least two support points.

12. The device of claim 8, wherein said mechanical stop is resiliently disposed substantially perpendicular to a surface extension of the flap using a first spring element.

13. The device of claim 8, wherein said mechanical stop is resiliently held in a preferred pivoting position about said axis of rotation using a second spring element.

14. The device of claim 8, wherein said pneumatic suctioning device and said mechanical stop are structured as a closing wedge simulation unit which can be pivoted about a common axis of rotation.

15. The device of claim 14, wherein said pneumatic suctioning device is structured as an expansion bellows suctioning device, with a portion of said mechanical stop on which the flap is supported being disposed inside said expansion bellows.

16. The device of claim 8, further comprising an additional pneumatic suctioning device to hold the device on the surrounding body.

17. The device of claim 16, wherein said additional pneumatic suctioning device is disposed on said stop in a region of at least one support point on the surrounding body.

* * * * *